Nov. 7, 1939.  J. P. KRIECHBAUM  2,179,044
ZONE CONTROL SYSTEM
Filed May 9, 1935  2 Sheets—Sheet 2

INVENTOR
John P. Kriechbaum
BY HIS ATTORNEY
George H. Fisher

Patented Nov. 7, 1939

2,179,044

UNITED STATES PATENT OFFICE 2,179,044

ZONE CONTROL SYSTEM

John P. Kriechbaum, Minneapolis, Minn., assignor to Minneapolis-Honeywell Regulator Company, Minneapolis, Minn., a corporation of Delaware Application May 9, 1935, Serial No. 20,526

22 Claims. (Cl. 236—91)

This invention relates to zone control systems in general and more particularly to conditioning systems for a building having a plurality of zones by which the building is conditioned.

In conditioning systems of this type it often occurs that all of the zone valves controlling the supply of conditioning fluid to the various zones will open at substantially the same time thereby causing heavy drains on the conditioning fluid generator.

It is, therefore, an object of this invention to provide a means for preventing the opening of certain zone valves when other zone valves are being opened to effectively prevent drains on the conditioning fluid generator.

It is an object of this invention to provide in a conditioning system for a building having a plurality of zones, a plurality of valves for each zone controlling the supply of conditioning fluid to the zones, a controlling means associated with each zone for controlling the operation of the valves of that zone and means for preventing the opening of the valves of any zone when the valves of any other zone are opening.

Likewise, it is an object of this invention to provide a plurality of sets of motors, a plurality of motors in each set, and means for preventing the operation of one set of motors while another set of motors is operating.

Figure 1:
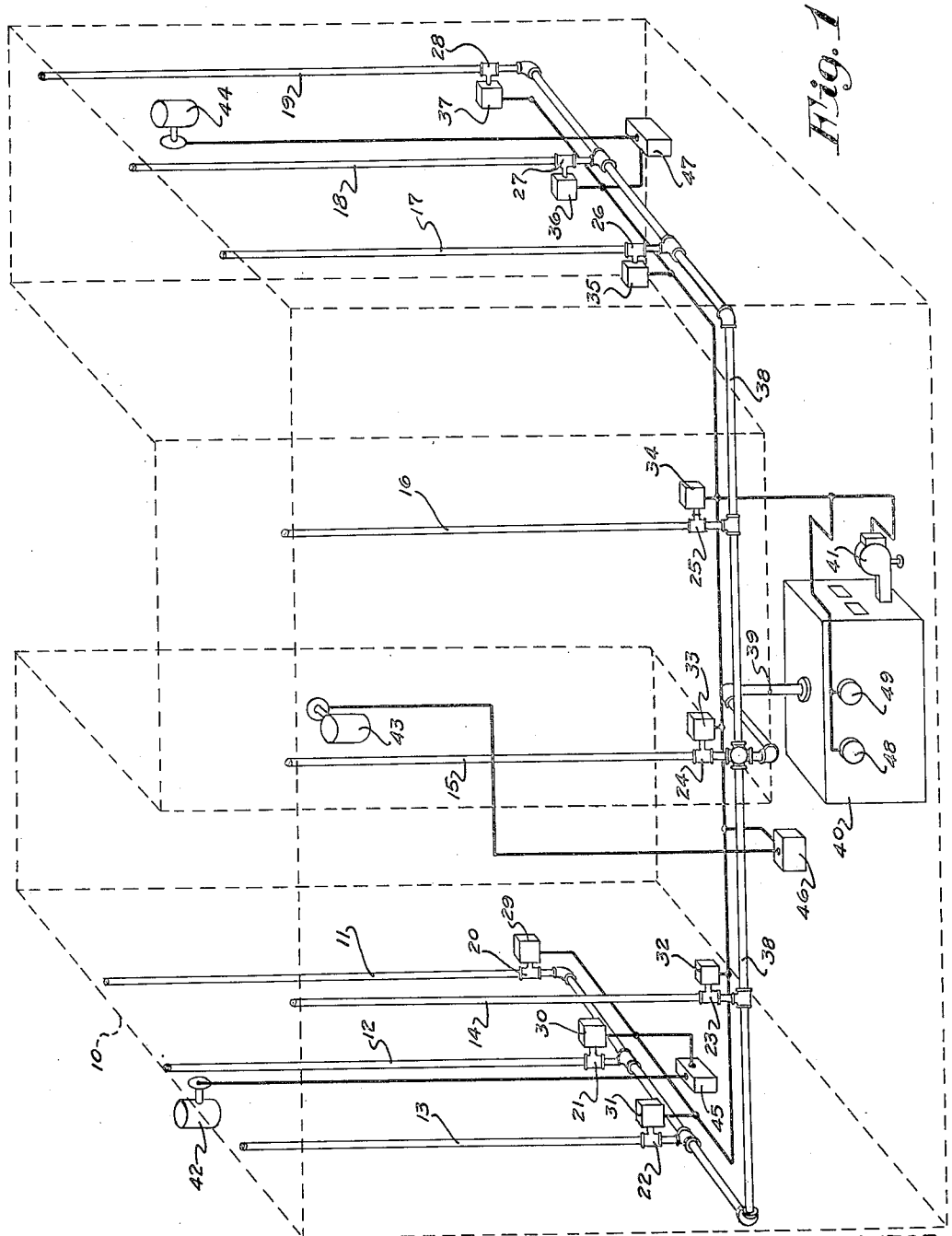
Figure 2:
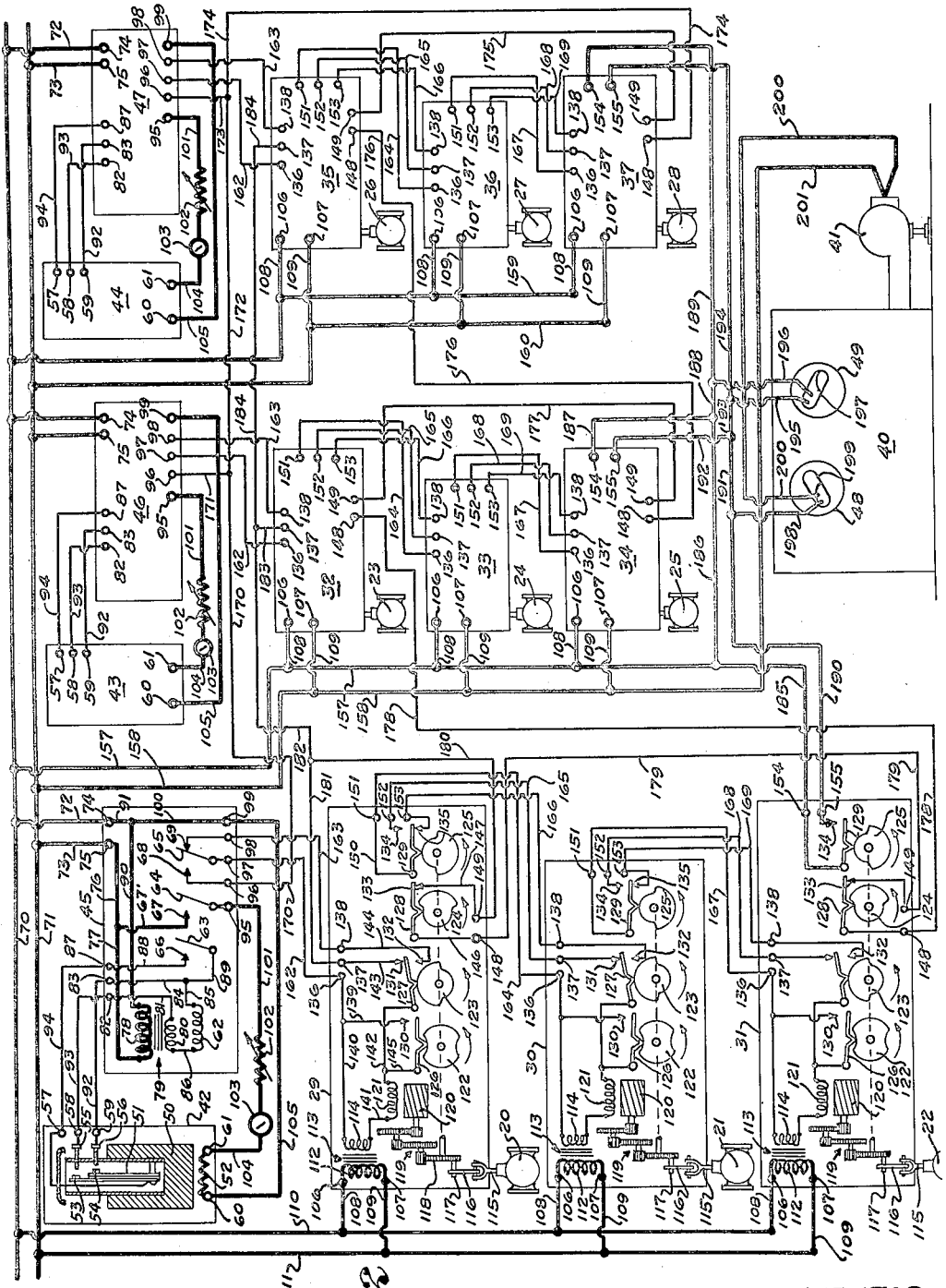

Other objects and advantages will become apparent to those skilled in the art upon reference to the accompanying specification, claims and drawings, in which drawings:

Fig. 1 is a diagrammatic perspective view of a heating system having my invention applied thereto; and Fig. 2 is a diagrammatic view of the elements disclosed in Fig. 1, showing how the system of my invention operates.

My invention is shown in Fig. 1 as applied to a building 10 that is U-shaped in plan view and which is divided into three zones for purposes of conditioning the same. Each zone is supplied with a plurality of risers leading to radiators in the zone by which conditioning fluid, which may take the form of steam, may be delivered to the radiators for conditioning that zone of the building. The risers are designated at 11, 12 and 13 for the left hand zone; 14, 15 and 16 for the central zone; and 17, 18 and 19 for the right hand zone. Each riser 11, 12, 13, 14, 15, 16, 17, 18 and 19 is provided with a valve 20, 21, 22, 23, 24, 25, 26, 27 and 28, respectively, and each valve is controlled by a motor 29, 30, 31, 32, 33, 34, 35, 36 and 37, respectively. The risers receive a supply of heating fluid, such as steam, from a header 38 which is connected to a source of heating fluid such as boiler 40 by a pipe 39. The boiler 40 is fired in any suitable manner but is here shown to be fired by an oil burner 41.

Although any type of controller may be used for controlling the temperature within each zone, I have shown for purposes of illustration, outdoor controllers 42, 43 and 44 of the type disclosed in application Serial Number 512,887 filed by Daniel G. Taylor on February 2, 1931. These controllers are suitably mounted on the exterior of the building to respond to changes in atmospheric conditions including temperature, wind, wind direction and solar radiation. The controller 42 controls the temperature within the left hand zone, the controller 43 within the central zone, and the controller 44 within the right hand zone. The controller 42 operates through a relay 45 to control the motors 29, 30 and 31 for controlling the supply of heating fluid to the left hand zone. Likewise, the controller 43 controls through the relay 46 to operate the valve motors 32, 33 and 34 and the controller 44 operates through a relay 47 to operate the valve motors 35, 36 and 37. Mounted on the boiler in any suitable manner, is a high limit controller 48 and a low limit controller 49 which assist in controlling the oil burner 41 which fires the boiler 40. As seen in Fig. 1 the outdoor controllers, the relays, the valve motors, the limit controllers and the oil burners are all suitably connected by means of electrical conduits.

The manner in which these various elements are electrically connected together is seen upon reference to Fig. 2 of the drawings. The controller 42 comprises a metallic block 50 enclosed within a weather-tight casing and affected by outside atmospheric conditions such as temperature, wind and solar radiation. Located within the metallic block 50 and responding to the temperature of the same is a bimetallic element 51. The block 50 is heated by means of a heater 52 and is cooled by the outdoor atmospheric conditions. The bimetallic element 51 carries contacts 53 and 54, which are adapted to sequentially engage adjustable contacts 55 and 56. The bimetallic element 51 is electrically connected to a binding post 57 and the adjustable contacts 55 and 56 are electrically connected to binding posts 58 and 59, respectively. The heater 52 is connected to binding posts 60 and 61. Inasmuch as the outdoor controllers 43 and 44 are identical to the outdoor controller 42, the structure thereof has not been shown, it being considered sufficient to show only the exterior electrical connections thereof.

Located in the relay 45 is a relay coil 62 which controls the operation of switch arms 63, 64 and 65. Upon energization of the relay coil 62, the switch arms 63, 64 and 65 will move into engagement with contacts 66, 67 and 68, respectively, and upon deenergization of the relay coil 62 the switch arms will move out of engagement with these contacts and the switch arm 65 will be moved into engagement with a contact 69 by means of springs, gravity or other means not shown. Line wires leading from some source of power (not shown) are designated at 70 and 71. Wires 72 and 73 connect the line wires 70 and 71 with binding posts 74 and 75 on the relay 45. The binding post 75 is connected by means of wires 76 and 77 to one end of primary 78 of a step-down transformer 79 having a secondary 80. The other end of the primary 78 is connected by means of wires 90 and 91 to the other binding post 74. A wire 81 connects one end of the secondary 80 with the binding post 82. A binding post 83 is connected by means of wires 84 and 85 to one end of the relay coil 62. The other end of the relay coil 62 is connected by means of a wire 86 to the other end of the secondary 80. The contact 66 is connected by a wire 88 with a binding post 87. The switch arm 63 is connected by a wire 89 to the junction of wires 84 and 85. A wire 92 connects the binding posts 83 and 59, a wire 93 connects the binding posts 82 and 58, and a wire 94 connects the binding posts 87 and 57. A binding post 95 is electrically connected to the switch arm 64, a binding post 96 is connected to the contact 68, a binding post 97 is connected to the switch arm 65, a binding post 98 is connected to the contact 69 and a binding post 99 is connected by a wire 100 to the junction of wires 90 and 91. The binding post 95 is connected by a wire 101 to a variable resistance 102 which is in turn connected to an ammeter 103. A wire 104 connects the ammeter 103 with the binding post 61 and the binding post 60 is connected by a wire 105 with the binding post 99.

The transformer 79 is at all times energized by the line wires 70 and 71. When the temperature of the block 50 drops below a predetermined value due to the cooling action of the outside atmosphere, contact 53 engages contact 55. Upon a further drop in block temperature, contact 54 engages contact 56 to complete a circuit from the secondary 80 through wire 81, post 82, wire 93, post 58, contacts 55, 53, 54 and 56, post 59, wire 92, post 83, wires 84 and 85, relay coil 62 and wire 86 back to the secondary 80. This causes energization of the relay coil 62 to move the switch arms 63, 64 and 65 into engagement with the contacts 66, 67 and 68. Movement of the switch arm 63 into engagement with contact 66 completes a second or holding circuit from the secondary 80 through wire 81, post 82, wire 93, post 58, contacts 55 and 53, bimetallic element 51, post 57, wire 94, post 87, wire 88, contact 66, switch arm 63, wires 89 and 85, relay coil 62 and wire 86 back to the secondary 80. This circuit maintains the relay coil 62 energized until the contact between the contacts 53 and 55 is broken. When the switch arm 64 moves into engagement with contact 67, a circuit is completed from the line wire 71 through wire 73, post 75, wires 76 and 67', contact 67, switch arm 64, post 95, wire 101, variable resistance 102, ammeter 103, wire 104, post 61, heater 52, post 60, wire 105, post 99, wires 100 and 91, post 74 and wire 72 back to the line wire 70. Completion of this circuit causes heating of the heater 52 and consequent heating of the block 50. When the block 50 has been heated in this manner so that the temperature thereto has risen to a given value, contact between the contacts 53 and 55 is broken to deenergize the relay coil 62, to move the switch arms 63, 64 and 65 to the right. When the switch arm 64 moves out of engagement with the contact 67 the further supply of heat to the heater 52 of the outdoor controller 42 is prevented. The variable resistance 102 and the ammeter 103 provide a means for adjusting and visually indicating the amount of heat delivered to the outdoor controller 42.

Since the relays 46 and 47 are identical with the relay 45 and since the operation thereof is identical to the relay 45, only the exterior wiring connections have been shown and have been designated by like reference characters.

The motor 29 for operating the valve 20 is provided with binding posts 106 and 107 which are connected across wires 110 and 111 by means of wires 108 and 109. The wires 110 and 111 are in turn connected across the line wires 70 and 71. Connected across the posts 106 and 107 is a primary 112 of a step-down transformer 113 having a secondary 114. The valve 20 is operated by a valve stem 115 which is connected to a pitman 116 journalled on a crank pin 117. The crank pin 117 is carried by a gear 118 which is driven through a reduction gear train 119 by a rotor 120 upon energization of a field 121. The gear 118 also operates cams 122, 123, 124 and 125 which in turn operate contact arms 126, 127, 128 and 129, respectively. When the high dwells of the cam 122 engage the contact arm 126, the contact arm 126 is moved into engagement with contact 130. When the high dwell of the cam 123 engages the contact arm 127 the contact arm 127 is moved into engagement with the contact 131 and when the low dwell of the cam 123 becomes operative, the contact arm 127 engages the contact 132. The contact arm 128 is normally in engagement with the contact 133 but when the high dwell of the cam 124 engages the contact arm 128, it is moved out of engagement with the contact 133. When the high dwell of the cam 125 engages the contact arm 129 the contact arm is moved into engagement with a contact 134, and when the low dwell of the cam 125 becomes operative, the contact arm 129 moves into engagement with a contact 135.

The valve motor 29 is provided with binding posts 136, 137 and 138. The binding post 136 is connected by a wire 140 to one end of the secondary 114. The other end of the secondary 114 is connected by a wire 141 to one end of the field 121. The other end of the field 121 is connected by a wire 142 to the contact arm 127, the contact 131 is connected by a wire 143 to the post 137 and the contact 132 is connected by a wire 144 to the post 138. The contact arm 126 is connected by a wire 145 to the field 121 and the contact 130 is connected by a wire 139 to the wire 140 between the secondary 114 and the binding post 136. The contact arm 128 is connected by a wire 146 to a binding post 148 and the contact 133 is connected by a wire 147 to a binding post 149. The contact arm 129 is connected by a wire 150 to a binding post 151 and the contact 134 and 135 are electrically connected to binding posts 152 and 153 respectively.

With the parts of the valve motor 29 in the position shown the valve 20 is in a closed position. Upon energization of the relay 45 which moves the switch arm 65 into engagement with contact 68 to electrically connect the posts 136 and 137, a circuit is completed from the secondary 114 through wire 140, post 136, exterior circuit, post 137, wire 143, contact 131, contact arm 127, wire 142, field 121 and wire 141 back to the secondary 114 to energize the field 121 and move the valve 20 to the open position. When the valve 20 has been started in its movement towards an open position, contact arm 126 engages contact 130 to complete a circuit from the secondary 114 through wires 140 and 139, contact 130, contact arm 126, wire 145, field 121 and wire 141 back to the secondary 114 to energize the field 121 to completely move the valve 20 to its open position. When the valve 20 is fully opened, the contact arm 126 disengages the contact 130 to break the above maintaining circuit and the contact arm 127 is moved into engagement with the contact 132 to position the parts of the valve motor for the closing movement of the valve 20.

It will be noted at this point that as the valve 20 was being moved from the closed position to the open position, the high dwell of the cam 124 moved the contact arm 128 out of engagement with the contact 133. It will also be noted that when the valve 20 is in either extreme position or when the valve 20 is being moved from its open position to its closed position the contact arm 128 is in engagement with the contact 133. Further, when the valve 20 is moved to its open position in the above manner the contact arm 129 is moved into engagement with the contact 134 by the high dwell of the cam 125.

When the switch arm 65 of the relay 45 engages the contact 69 upon deenergization of the relay coil 62 to electrically connect the posts 136 and 138 of the valve motor 29 are electrically connected together to complete a circuit from the secondary 114 through wire 140, posts 136 and 138, wire 144, contact 132, contact arm 127, wire 142, field 121 and wire 141 back to the secondary 114 to start the valve 20 on its movement towards its closed position. When the valve 20 has started its closing movement the contact arm 126 engages the contact 130 to complete a circuit from the secondary 114 through wires 140 and 139, contact 130, contact arm 126, wire 145, field 121 and wire 141 back to the secondary 114 to complete the closing movement of the valve 20. When the valve 20 has been completely closed the contact arm 126 is moved out of engagement with the contact 130 and the contact arm 127 is moved into engagement with the contact 131 to position the valve motor parts for opening movement of the valve 20. It will be noted at this point that when the valve 20 is moved to its closed position the contact arm 129 is moved into engagement with the contact 135.

The valve motors 32 and 35 are identical with the valve motor 29 and therefore only the external wiring connections have been shown. The valve motor 30 for operating the valve 21 is identical with the valve motor 29 with the exception that the cam 124, the contact arm 128, the contact 133 and the binding posts 148 and 149 have been eliminated. The valve motors 33 and 36 are identical with the valve motor 30 and only the external wiring connections are shown. The valve motor 31 for operating the valve 22 is identical with the valve motor 29 except that the contact arm 129 operated by the cam 125 coacts with only one contact 134 instead of two contacts 134 and 135 as in the valve motor 29. To set forth this distinction, the contact arm 129 is connected to a binding post 155. The valve motors 34 and 37 for operating the valves 25 and 28 are identical with the valve motor 31 and therefore only the external wiring connections have been shown.

Power is supplied to the valve motors 32, 33 and 34 by means of wires 157 and 158, connected across the line wires 70 and 71 through wires 108 and 109 leading to the binding posts 106 and 107 of the valve motors 32, 33 and 34. In a like manner power is supplied to the valve motors 35, 36 and 37 by wires 159 and 160, connected across the line wires 70 and 71. The wires 108 and 109 connect the binding posts 106 and 107 of the valve motors 35, 36 and 37 with the wires 159 and 160, respectively.

The binding posts 97 and 98 of the relay 45 are connected to the binding posts 136 and 138 of the valve motor 29 by wires 162 and 163 respectively. The binding posts 151, 152 and 153 of the valve motor 29 are connected to the binding posts 136, 137 and 138 of the valve motor 30 by means of wires 164, 165 and 166, respectively. Likewise the binding posts 151, 152 and 153 of the valve motor 30 are connected to the binding posts 136, 137 and 138 of the valve motor 31 by means of wires 167, 168 and 169 respectively. The relay 46 and the valve motors 32, 33 and 34 and the relay 47 and the valve motors 35, 36 and 37 are connected together in the same manner that the relay 45 and the valve motors 29, 30 and 31 are connected together.

The binding post 96 of the relay 45 is connected to the binding post 96 of the relay 46 by wires 170 and 171 and the binding post 96 of the relay 47 is connected by means of wires 172 and 173 to the junction of wires 170 and 171. A wire 174 connects the junction of wires 172 and 173 with the binding post 148 of the valve motor 37. The binding post 149 of the valve motor 37 is connected to the binding post 149 of the valve motor 35 by a wire 175. The binding post 148 of the valve motor 35 is connected by a wire 176 to the binding post 148 of the valve motor 34. The binding post 149 of the valve motor 34 is connected to the binding post 149 of the valve motor 32 by a wire 177. The binding post 148 of the valve motor 32 is connected to the binding post 148 of the valve motor 31 by a wire 178. The binding post 149 of the valve motor 31 is connected by a wire 179 to the binding post 148 of the valve motor 29. The binding post 149 of the valve motor 29 is connected by wires 180 and 181 to the binding post 137 of the valve motor 29. From the above wiring connections it is seen that the binding posts 96 of the relays 45, 46 and 47 are connected in parallel and that the binding posts 137 of the valve motors 29, 32 and 35 are also connected in parallel.

When the outdoor controller 42 calls for heat to energize the relay coil 62 to move the switch arm 65 into engagement with the contact 68 of the relay 45, a circuit is completed in the manner to be described hereafter to cause opening movement of the valve 20. When the valve 20 has been opened the cam 125 of the valve motor 29 causes the contact arm 129 to engage the contact 134 to operate the valve motor 30 to move the valve 21 to its open position. When the valve 21 is opened the cam 125 of the valve motor 30 moves the contact arm 129 into engagement with the contact 134 to operate the valve motor 31 to open the valve 22. Thus, when the outdoor controller calls for heat the valve 20 is first opened, then the valve 21 and then the valve 22. Likewise, when the outdoor controller 43 calls for heat, the valve 23, then the valve 24 and then the valve 25 are opened. Similarly, when the outdoor controller 44 calls for heat, the valve 26 is first opened, then the valve 27 and then the valve 28.

When the outdoor controller 42 is satisfied, the relay coil 62 of the relay 45 is deenergized to move the switch arm 65 into engagement with the contact 69. This causes closing movement of the valve 20. When the valve 20 is closed the cam 125 of the valve motor 29 moves the contact arm 129 into engagement with contact 135 to operate the valve motor 30 to close the valve 21. When the valve 21 is closed the cam 125 of the valve motor 30 moves the contact arm 129 into engagement with the contact 135 to operate the valve motor 31 to close the valve 22. Thus, when the outdoor controller 42 is satisfied the valve 20 is first closed, then the valve 21 and then the valve 22. Likewise, when the outdoor controller 43 is satisfied the valve 23 is first closed, then the valve 24 and then the valve 25. Similarly, when the outdoor controller 44 is satisfied the valve 26 is first closed, then the valve 27 and then the valve 28.

In order to prevent a drain on the boiler 40, which would be caused by the three controllers 42, 43 and 44 calling for heat at substantially the same time, which would open all nine valves at substantially the same time, means are provided whereby if one zone is being operated to open the valves of its zone the other zones cannot be placed in operation until the valves of the first zone are completely opened. This is accomplished by the switch arms 128, the contacts 133 and the cams 124 located in the valve motors 29, 31, 32, 34, 35 and 37. As pointed out above, the contact arm 128 engages the contact 133 when the associated valve is in an open position or in a closed position or being moved from an open position to a closed position. Contact between the contact arm 128 and the contact 133 is broken when the associated valve is being moved from a closed position to an open position. The connection between the binding posts 96 of the relays 45, 46 and 47, and the binding post 137 of the valve motors 29 and 32 pass serially through all of the switches comprised of the contact arm 128 and contact 133. Specifically, when the switch arm 65 of the relay 45 is moved into engagement with the contact 68, upon a call for heat by the outdoor controller 42, a circuit is completed from the binding post 136 of the valve motor 29 through wire 162, binding post 97 of the relay 45, switch arm 65, contact 68, binding post 96 and wires 170, 172 and 174, binding posts 148 and 149 of the valve motor 37, wire 175, binding posts 149 and 148 of the valve motor 35, wire 176, binding posts 148 and 149 of the valve motor 34, wire 177, binding posts 149 and 148 of the valve motor 32, wire 178, binding posts 148 and 149 of the valve motor 31, wire 179, binding posts 148 and 149 of the valve motor 29 and wires 180 and 181 to the binding post 137 of the valve motor 129 to cause operation of the valve motor 129 to move the valve 20 to an open position. It is, therefore, seen that if any of the valve motors 32, 34, 35 and 37 are at that time being moved from a closed position to an open position it is impossible to complete the above described circuit to open the valve 20. Therefore, if the valves 23, 24 and 25 of the second zone or if the valves 26, 27 and 28 of the third zone are being opened it is impossible to open the valves 20, 21 and 22 of the first zone. Similarly, the connections between the binding post 96 of the relays 46 and 47 and the binding posts 137 of the valve motors 32 and 35 are identical with the connections between the binding post 96 of the relay 45 and the binding post 137 of the valve motor 29. By reason of this similar relation it is impossible to open the valves 23, 24 and 25 while the valves 20, 21 and 22 or the valves 26, 27 and 28 are being opened. Also, it is impossible to open the valves 26, 27 and 28 while the valves 20, 21 and 22 or the valves 23, 24 and 25 are being opened. Inasmuch as it takes some time to open all the valves of one zone and since it is impossible to open the valves of another zone while the first zone valves are being opened, sudden drains on the boiler and consequent surges therein are substantially eliminated.

If it be desirable to control the operation of the boiler 40 in accordance with the opening of any of the zone steam valves, the cams 125, the contact arms 129 and the contacts 134 located in the valve motors 31, 34 and 37 are provided. A wire 185 connects the wire 157 with the binding post 154 of the valve motor 31. Wires 186 and 187 likewise connect the wire 157 to the binding post 154 of the valve motor 34. Also the wires 186, 188 and 189 connect the wire 157 with the binding post 154 of the valve motor 37. The binding post 155 of the valve motor 31 is connected by wires 190, 191, 192, 193 and 194 to the binding posts 155 of the valve motors 34 and 37. The low limit control 49 responsive to the condition of the boiler 40 operates a mercury switch 197, the electrodes of which are connected by wires 195 and 196 to wires 193 and 188, respectively. When the condition of the boiler 40 drops below a predetermined value the low limit controller 49 tilts the mercury switch 197 to cause the mercury therein to bridge the electrodes. When the condition of the boiler is normal the mercury switch 197 is tilted to a circuit open position. The high limit controller 48 which responds to the condition of the boiler operates a mercury switch 199 so that when the condition in the boiler becomes abnormally high the mercury is moved out of engagement with the electrodes. One of the electrodes of the mercury switch 199 is connected by a wire 198 to the wire 191. The other electrode is connected by a wire 200 to the oil burner 41. The oil burner in turn is connected by a wire 201 to the wire 158. From the above wiring connections it is seen that the binding posts 154 and 155 of the valve motors 31, 34 and 37 and the electrodes of the mercury switch 197 of the low limit controller 49 are connected in parallel so that when any of the valves 22, 25 and 28 are moved to an open position or when the condition of the boiler becomes abnormally low, the oil burner 41 is placed in operation. It is also seen that the mercury switch 199 of the high limit controller 48 is located in series with the oil burner 41 so that if the condition within the boiler 40 becomes abnormally high the oil burner is prevented from operating.

By reason of these connections a predetermined condition is maintained within the boiler 40 by the low limit controller 49 so that when any of the riser valves are open, steam will be supplied immediately to the radiators within the building. Also due to the riser valves opening, a demand is placed on the boiler and in order to meet this demand the oil burner 41 is placed in operation to form steam in the boiler 40.

Although I have disclosed one specific embodiment of this invention for purposes of illustration, it is apparent that other modifications may be employed and, therefore, I intend that my invention shall be limited only by the scope of the appended claims and the prior art.

I claim as my invention:

1. In a system of the class described, a plurality of sets of motors, a plurality of motors in each set, a controller for each set of motors, the controller placing one motor in operation and that motor placing the other motors of the set in operation, and means for preventing the operation of any set of motors when any of the other sets of motors are operating.

2. In a system of the class described, a plurality of sets of motors, a plurality of motors in each set, a controller for each set of motors, the controller placing one motor in operation and that motor placing the other motors of the set in operation, and means controlled by the motors for preventing the operation of any set of motors when any of the other sets of motors are operating.

3. In a system of the class described, a plurality of motors, means for individually controlling the operation of said motors, means for preventing operation of some of said motors in case others of said motors are operating, another motor, and means actuated by any one of said plurality of motors for starting said other motor.

4. In a system of the class described, a plurality of sets of motors, a plurality of motors in each set, means for controlling the operation of each set of motors, means for preventing the operation of one set of motors in case another set of motors is operating, another motor, and means for placing the other motor in operation when any of the sets of motors are operated.

5. In a system of the class described, a plurality of sets of motors, a plurality of motors in each set, a controller for each set of motors, the controller placing one motor in operation and that motor placing the other motors of the set in operation, means for preventing the operation of any set of motors when any of the other sets of motors are operating, another motor, and means for placing the other motor in operation upon operation of the motors in any set of motors.

6. In a conditioning system for a building having a plurality of zones, a plurality of valves for each zone controlling the supply of conditioning fluid to the zone, means associated with each zone for controlling the operation of the valves of that zone, and means for preventing the opening of the valves of one zone when the valves of any other zone are opening.

7. In a conditioning system for a building having a plurality of zones, a plurality of valves for each zone controlling the supply of conditioning fluid to the zone, means associated with each zone for controlling the operation of the valves of that zone, and means controlled by the valves for preventing the opening of the valves in any zone when the valves of any other zone are opening.

8. In a conditioning system for a building having a plurality of zones, a plurality of valves for each zone controlling the supply of conditioning fluid to the zone, means associated with each zone for controlling the operation of the valves of that zone, the means controlling the operation of one of the valves and that valve controlling the other valves of the zone, and means for preventing the opening of the valves in any zone when the valves of any other zone are opening.

9. In a conditioning system for a building having a plurality of zones, a plurality of valves for each zone controlling the supply of conditioning fluid to the zones, means associated with each zone for controlling the operation of the valves of that zone, the means controlling the operation of one of the valves and that valve controlling the other valves of the zone, and means controlled by the valves for preventing the opening of the valves in any zone when the valves of any other zone are opening.

10. In a conditioning system for a building having a plurality of zones, a plurality of valves for controlling the supply of conditioning fluid to the zones, means for preventing opening of some of the valves when other of the valves are opening, a conditioning fluid generator, and means controlled by the valves for operating said generator.

11. In a conditioning system for a building having a plurality of zones, a plurality of valves for each zone controlling the supply of conditioning fluid to the zone, means associated with each zone for controlling the operation of the valves of that zone, means for preventing the opening of the valves of one zone when the valves of any other zone are opening, a conditioning fluid generator, and means for placing the generator in operation when the valves of any zone are opened.

12. In a conditioning system for a building having a plurality of zones, a plurality of valves for each zone controlling the supply of conditioning fluid to the zone, means associated with each zone for controlling the operation of the valves of that zone, the means controlling the operation of one of the valves and that valve controlling the other valves of the zone, means for preventing the opening of the valves in any zone when the valves of any other zone are opening, a conditioning fluid generator, and means for placing the generator in operation upon opening of the valves in any zone.

13. In a conditioning system for a building having a plurality of zones, a plurality of valves for each zone for controlling the supply of conditioning fluid to the zone, an outdoor controller associated with each zone for controlling the operation of the valves of that zone, and means for preventing the opening of the valves of any zone when the valves of any other zone are opening.

14. In a heating system for a building having a plurality of zones, a plurality of valves for each zone for controlling the supply of heating fluid to the zone, an outdoor controller associated with each zone having heating means and temperature responsive means, the temperature responsive means controlling the controller heating means at the valves of that zone to maintain a normal temperature in each zone, and means for preventing the opening of the valves of any zone when the valves of any other zone are opening.

15. In a conditioning system for a building having a plurality of zones, a plurality of valves for each zone for controlling the supply of conditioning fluid to the zone, an outdoor controller associated with each zone for controlling the operation of the valves of that zone, means for preventing the opening of the valves of any zone when the valves of any other zone are opening, and means for generating heating fluid when the valves of any zone are opened.

16. In a heating system for a building having a plurality of zones, a plurality of valves for each zone for controlling the supply of heating fluid to the zones, an outdoor controller associated with each zone having heating means and temperature responsive means, the temperature responsive means controlling the controller heating means and the valves of that zone to maintain a normal temperature in each zone, means for preventing the opening of the valves of any zone when the valves of any other zone are opening, and means for generating heating fluid when the valves of any zone are opened.

17. In a conditioning system for a building having a plurality of zones, a flow controller for controlling the flow of conditioning medium to each zone, a condition responsive device for each zone, each condition responsive device being arranged to control the flow control device of its associated zone in accordance with the demand for conditioning, and interconnecting means for preventing any one flow controller from substantially varying the supply of conditioning medium to its respective zone when any other flow controller is already substantially varying the supply of conditioning medium to its zone.

18. In a system of the class described, a plurality of sets of flow controllers, a plurality of flow controllers in each set, a plurality of sets of motors for actuating said flow controllers, a controller for each set of flow controllers, said controllers controlling the motors of their respective sets of flow controllers in a manner to place the respective motors into and out of operation, and interlocking means connected with said sets of motors for preventing operation of one set of motors in case another set of motors is operating.

19. In a conditioning system for a building having a plurality of zones, a control system for each zone, each control system including a flow controller for controlling the flow of conditioning medium to its zone and a condition responsive device for controlling the flow controller in a manner to maintain a predetermined value of the condition within the zone, interconnecting means between said control systems for preventing actuation of said flow controllers, said interconnecting means including means actuated upon initiation of movement of one flow controller for preventing substantial movement of the other flow controllers until the expiration of a predetermined time period following the initiation of movement of said one flow controller.

20. A system comprising in combination, a plurality of members for controlling the condition of a space, means for increasing and decreasing the conditioning medium supply to said members, a motor for individually operating each of said means, condition responsive means for controlling each of said motors, interlocking means associated with said motors, and operable, while one of said motors is operating to increase the supply of conditioning medium to one of said members, to prevent any of the other of said motors from operating to increase the supply of conditioning medium to its respective member, regardless of demand by its condition responsive means.

21. In a conditioning system for a building having a plurality of zones, valve means for each zone for controlling the supply of conditioning fluid to their respective zones, control means associated with each zone for individually opening the valve means of their respective zones on demand for conditioning fluid in that zone whereby desired conditions are maintained in each zone, and means for preventing opening of the valve means of any zone when the valve means of any of the other zones are opening regardless of whether the control means of that zone demands opening of the valve means of that zone.

22. In a conditioning system for a building having a plurality of zones, valve means for each zone for controlling the supply of conditioning fluid to their respective zones, control means associated with each zone, each including means responsive to outside temperature conditions adjacent that zone, for opening the valve means of their respective zones on demand for conditioning fluid whereby desired conditions are maintained in each zone, and means for preventing opening of the valve means of any zone when the valve means of any of the other zones are opening regardless of whether the control means of that zone demands opening of the valve means of that zone.

JOHN P. KRIECHBAUM.